(12) United States Patent
Boydston et al.

(10) Patent No.: US 6,584,326 B1
(45) Date of Patent: Jun. 24, 2003

(54) MULTIPLE SUBSCRIBER INTERFACE AND SIMPLIFIED PROVISIONING PROCESS FOR INSTALLATION OF MULTIPLE CELLULAR AND/OR MOBILE SATCOM SERVICES

(75) Inventors: Thad Boydston, Kansas City, MO (US); Kevin Parmenter, Overland Park, KS (US); Daniel R. Barbour, Overland Park, KS (US)

(73) Assignee: AlliedSignal Inc., Morristown, NJ (US)

( * ) Notice: Subject to any disclaimer, the term of this patent is extended or adjusted under 35 U.S.C. 154(b) by 0 days.

(21) Appl. No.: 09/457,752

(22) Filed: Dec. 8, 1999

Related U.S. Application Data (60) Provisional application No. 60/111,509, filed on Dec. 8, 1998, and provisional application No. 60/111,510, filed on Dec. 8, 1998.

(51) Int. Cl.[7] .............................. H04B 1/38; H04M 1/00

(52) U.S. Cl. ...................... 455/558; 455/557; 455/550
(58) Field of Search ........................... 455/12.1, 73, 74, 455/455, 464, 555, 556, 557, 558, 552, 425, 550

(56) References Cited

U.S. PATENT DOCUMENTS

| 4,616,108 | A | * | 10/1986 | Yamaguchi et al. ........ 455/12.1 |
| 5,140,679 | A | * | 8/1992 | Michael ...................... 710/106 |
| 5,465,401 | A | * | 11/1995 | Thompson ............. 379/357.01 |
| 6,223,052 | B1 | * | 4/2001 | Ali Vehmas et al. ........ 455/551 |
| 6,324,405 | B1 | * | 11/2001 | Young et al. ............... 455/12.1 |
| 6,400,965 | B1 | * | 6/2002 | Phillips et al. ......... 379/357.01 |

* cited by examiner

Primary Examiner—Nay Maung
Assistant Examiner—Raymond Persino (57) ABSTRACT

A method and circuit for performing serial data protocols and error checking, the circuit in a mobile cellular to satellite telecommunication system.

25 Claims, 5 Drawing Sheets

MULTIPLE SUBSCRIBER INTERFACE AND SIMPLIFIED PROVISIONING PROCESS FOR INSTALLATION OF MULTIPLE CELLULAR AND/OR MOBILE SATCOM SERVICES

This application claims the benefit of U.S. Provisional Application Ser. No. 60/111,509 filed in the names of Thad Boydston and Kevin Parmenter on Dec. 8, 1998, and U.S. Provisional Application Ser. No. 60/111,510 filed in the name of Daniel R. Barbour on Dec. 8, 1998, the complete disclosures of which are incorporated herein by reference.

FIELD OF THE INVENTION

Mobile cellular to satellite telecommunication systems, and in particular the installation, programming and accessing of subscriber interface modules thereof.

BACKGROUND OF THE INVENTION

Mobile cellular to satellite communication, or SatCom, system radio transceivers having multiple voice and data input/output channels are known. Such mobile cellular to SatCom systems accept data and voice from various sources onboard a host aircraft or other vehicle, encode and modulate this information to appropriate Radio Frequency (RF) carrier frequencies, and transmit these carriers to a satellite constellation for relay to the ground. Mobile cellular to SatCom systems also receive RF signals from the satellite constellation, demodulate these signals, perform the necessary decoding of the encoded messages, and output data or voice for use onboard the aircraft by crew members and passengers. One example of such a mobile cellular to SatCom system is the AIRSAT® Multi-Channel Satellite Communication System, described in a brochure published October 1997 by AlliedSignal Incorporated, entitled "AIRSAT MULTI-CHANNEL SATELLITE COMMUNICATION SYSTEM for IRIDIUM®," which provides worldwide continuous multichannel voice and data communications for commercial air transport aircraft.

While the number of communication channels provided depends upon the manufacturer's implementation, a typical mobile cellular to SatCom system unit supports multiple communication channels. One specific implementation currently provides 30 voice channels and 30 data channels. Specific proprietary implementations of the mobile cellular to SatCom system unit support multiple external interfaces, including, for example, up to 30 digitized voice channels interfacing with user terminals. Onboard a host aircraft the user terminals are the cabin and passenger telecommunication equipment, such as seatback telephone handsets. The user terminals interface with the mobile cellular unit control system through Subscriber Interface Modules, or SIM cards, that hold the user's identification for billing and other purposes. The SIM cards also each convert analog voice input into a digitized serial data stream. Multiple SIM cards are associated with each channel of the mobile cellular unit. The SIM cards, sometimes referred to as microprocessor cards, include an eight-bit microprocessor that ensures the safety of the data and allows multiple use of a single user terminal.

All mobile cellular units use a micro-controller, or microprocessor, to interface between the main system central processing unit, or CPU, and the SIM cards. The micro-controller is part of a SIM card reader, which also includes several interface circuits, one for each SIM card. The main CPU lacks the processing time available to handle the actual serial data. The SIM card reader off-loads processing overhead from the main system CPU and relays information from the SIM cards. Although all known SIM card readers include a micro-controller interface between the main system CPU and the SIM interface circuits, the SIM card reader generally allows the micro-controller access to only one or at most two SIM cards.

One known implementation includes multiple conventional universal asynchronous receiver-transmitters, or UARTs, each interfacing with a each SIM card to convert the SIM card serial output to parallel data so that it can be received by the CPU. Another known implementation includes a conventional UART and a micro-controller to interface between the SIM cards and the CPU, but fails to allow access to more than one SIM card. Still another known implementation includes a conventional universal asynchronous receiver-transmitter, or UART, to manage the serial output of the micro-controller for the CPU. Although this combination of micro-controller and UART in the SIM card reader allows the main system CPU to access up to six to nine SIM cards, even this level of access is insufficient in mobile cellular units providing as many as 30 or more voice channels. A mobile cellular unit would require several of any of the prior art SIM card readers to support such a large number of channels, thus resulting in multiples of the SIM card reader functionality. Furthermore, the additional micro-controllers reduce overall system reliability.

Figure 1:
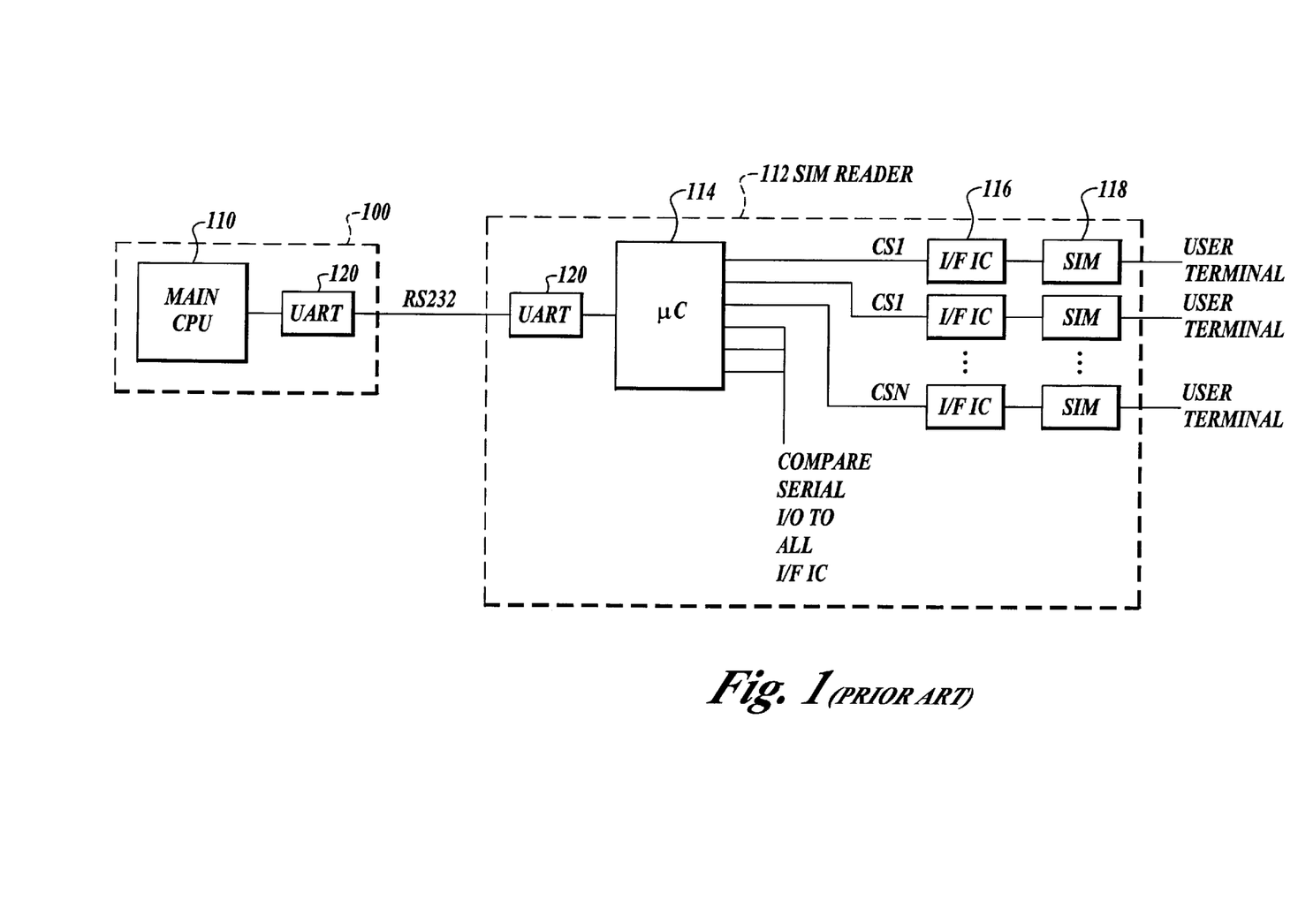
FIG. 1 is a block diagram of one prior art mobile cellular unit transmitting and receiving signals between multiple user terminals, such as cabin and passenger telecommunication equipment onboard a host aircraft or other vehicle and a satellite constellation for relay to ground stations.

FIG. 1 is a block diagram of one prior art mobile cellular unit 5 transmitting and receiving signals between multiple user terminals, such as cabin and passenger telecommunication equipment onboard a host aircraft or other vehicle, for example, seatback telephone handsets, and a satellite constellation for relay to ground stations. The mobile cellular unit must access each of the user terminals to provide this user terminal-to-satellite interface. As shown in FIG. 1, the mobile cellular unit of the prior art includes a control system 100 having a main system central processing unit, or CPU, 110 performing the actual receive and transmit functions between mobile cellular unit 10 and the satellite constellation. CPU 110 interfaces with multiple user terminals through a SIM card reader 112.

The SIM card reader illustrated in FIG. 1 is the only known prior art device that permits the main system CPU to access more than one or two SIM cards. Other mobile cellular units require a different SIM card reader to access each SIM card. In FIG. 1, prior art SIM card reader 112 includes a built-in microprocessor, or micro-controller, 114 coupled via common serial I/O chip select. The chip select is a common control line available on each discrete SIM interface module or circuit 116. An active SIM interface circuit 116 has sole ownership of the common serial I/O line. Multiple lines $CS^1$, $CS^2$ through $CS^N$ couple to up to nine separate and independent interface circuits 116 to common serial I/O of micro-controller 114. Thus, each interface circuit 116 allows micro-controller 114 to access one Subscriber Interface Module, or SIM card, 118. SIM cards 118 interface with the user terminals to convert analog voice input into a digitized serial data stream for transmission over the serial interface to micro-controller 114. Micro-controller 114 off-loads control of individual SIM cards 118 from main system CPU 110, thereby reducing demands on the processing time required to handle the actual serial data. Micro-controller 114 incorporates an address register that it decodes to obtain chip selects for SIM cards 118. These chip selects are used by SIM card interface circuits 116 to access individual SIM cards 118.

Micro-controller 114 relays information from SIM cards 118 to CPU 110 over a standard RS232 interface. SIM card reader 112 also. includes a universal asynchronous receiver-transmitter, or UART, 120 at each end of the RS232 interface to manage the serial output of micro-controller 114 for CPU 110 by converting the serial data to parallel data so that it can be received by CPU 110. Still, mobile cellular unit requires multiple SIM card readers 112 to an nine SIM cards, such as is presented by one or more current mobile cellular-to-SatCom implemetations. Thus, as shown, the prior art device requires a complexity and redundancy of circuitry that increases the device cost while reducing reliability.

Accurate mapping of SIM cards to their associated terminals in the mobile cellular unit is critical to functionally enabling a system for operation on the mobile cellular to SatCom network. In a typical installation, the SIM cards are installed in the field. The field installer is required to accurately record each SIM card identification number and note the installation slot to which the SIM card applies. For aircraft installations which incorporate multiple SIM cards for handling multiple user terminals, the field installation process provides numerous opportunities for documenting and recording errors. For example, SIM card identification number transposing, mis-entering and/or mis-recording during installation of the physical slot location in which each individual SIM card resides within the mobile cellular unit.

Furthermore, field installation of SIM cards eliminates the opportunity for operational verification of the SIM card-to-control system electronic interface prior to installation. Field installation also introduces the potential for contamination of the SIM card's electrical contacts and subsequent degradation in operational reliability.

What is needed to ensure operationally integrity of the mobile cellular unit is an accurate and verifiable method of installing and mapping the SIM cards to associated terminals in the control system and a simplified physical construction with less operational components. For example, due to the safety rating of certain satellite communication products, it is undesirable to have field installation of SIM cards and additional processors in the mobile cellular unit.

SUMMARY OF THE INVENTION

The present invention overcomes the method and device limitations of the prior art by providing an interface circuit for use in a mobile cellular to satellite telecommunication system for interfacing between a main system central processing unit and multiple communication channels whereby the prior need for a micro-controller is eliminated. The present invention provides an enhanced UART interface circuit incorporating the functions of the micro-controller of the prior art, thereby eliminating the need for a micro-controller and simultaneously simplifying the device and the method.

According to one aspect of the invention, the UART interface circuit includes a receive function adapted to receive serial data through a standard serial I/O port from individual ones of the multiple communication channels of a mobile cellular to satellite telecommunication system; a control function cooperating with the receive function and adapted to control access to individual ones of the multiple communication channels; and a transmit function cooperating with each of the receive function and the control function, the transmit function adapted to transmit parallel data through a standard parallel port to the main system central processing unit. According to various aspects of the invention, the control function includes multiple control registers converting the serial data character stream received from the communication channel into parallel data; multiple data lines transferring each serial data character and for reading and writing to the control registers; multiple address lines, controlling which of the multiple control registers is accessed; and a chip select determining which one of the multiple communication channels is accessed.

According to another aspect of the invention, the receive function is further adapted to receive parallel data from the main system central processing unit of the mobile cellular to satellite telecommunication system, perform serial-to-parallel data conversion on the received parallel data, and the transmit function is further adapted to transmit the resulting serial data to predetermined ones of the multiple communication channels.

According to another aspect of the invention, the control function further includes an extra guard time counter for timing extra guard time for the multiple communication channels of the mobile cellular to satellite telecommunication system. Preferably, the extra guard time counter is implemented in hardware.

According to other aspects of the invention, receive function further includes an error detection function, which detects parity errors and asserts an error signal/retransmit request signal in response to a detected parity error. The transmit function further includes a detection function coupled to the receive function, which detects an asserted error signal/retransmit request signal.

Preferably, the detection function retransmits the last of the data characters in response to a detected error signal/retransmit request and generates an interrupt signal indicating the end of the retransmission of the last data characters in response to a signal received from the extra guard time counter indicating that the extra guard time has expired.

According to still another aspect of the invention, the present invention provides a method for interfacing between a system central processing unit and multiple communication channels, which eliminates the micro-controller of the prior art, thereby simplifying the process and improving reliability of control. According to the invention, the method for interfacing between a system central processing unit and multiple communication channels includes determining which individual one of the multiple communication channels is accessed; receiving a stream of serial data characters from the accessed communication channel; translating or converting the serial data characters into parallel data words; and transmitting the resulting parallel data words to the main system central processing unit.

According to another aspect of the invention, the method of receiving the serial data stream also includes detecting any parity errors in the serial data and asserting an error signal/retransmit request signal if a parity error is detected. Preferably the method further includes re-transmitting the last data character in response to an asserted error signal/retransmit request signal, and then generating an interrupt signal indicating the end of the retransmission. Preferably, generation of the interrupt signal is further dependent upon receiving a signal indicating the end of an extra guard time period.

According to yet another aspect of the invention, the invention provides a mobile cellular to satellite telecommunication system in which the micro-controller of the prior art is eliminated and an enhanced UART circuit assumes the function of performing serial data protocols and error checking. The mobile cellular to satellite telecommunication system of the invention includes multiple Subscriber Interface Modules, or SIM cards, that hold the user's identification for billing and other purposes and multiple SIM card interface circuits coupling individual SIM cards to the enhanced UART circuit of the invention, which performs the necessary serial data protocols and error checking. The enhanced UART circuit of the invention is coupled to the parallel port of a main system CPU, which receives the converted parallel data.

According to anther aspect of the invention, the enhanced UART circuit of the invention includes a chip select for addressing different individual ones of the SIM cards; multiple data lines for transferring the serial data characters received from the SIM card interface circuits and for reading and writing to different ones of a quantity of control registers; and an address register which is decoded by the SIM card interface circuits to obtain different chip selects, the address register corresponding to a quantity of address lines that determine which of the many control registers is accessed.

According to different aspects of the invention, the enhanced UART circuit of the invention is either embedded in a interface circuit coupled to a parallel port of the CPU, or embedded in a separate hardware module coupled to a parallel port of the CPU.

Other aspects of the invention also provide a method for controlling a mobile cellular to satellite telecommunication system, without the micro-controller of the prior art. The method of the present invention includes accessing an individual one of multiple communication channels, and through that channel accessing an individual one of multiple SIM cards; receiving a stream of serial data characters from the accessed communication channel; converting, or translating, the received serial data characters into parallel data words; and transmitting the resulting parallel data character words to the main system central processing unit.

According to aspects of the invention, preferred embodiments of the method of the invention include a receiving further detecting parity errors in the received serial data and asserting an error signal/retransmit request signal when a parity errors is detected. Preferably, the method also includes re-transmitting the last one of the data characters in the data stream when an asserted error signal/retransmit request signal is generated and received. Preferred embodiments of the invention also generate an interrupt signal indicating the end of the data character retransmission.

According to still other aspects of the invention, the method further provides remotely installing one or more of the SIM cards into a hardware carrier, for example, in the OEM factory, each SIM card forming multiple electrical interfaces with the hardware carrier; testing each SIM card-to-hardware carrier electrical interfaces; identifying each SIM card position in the hardware carrier and cross-referencing the SIM card position against a part number and serial number assigned to that hardware carrier; recording the information, preferably in electronic form downloaded to a computer diskette or an accessible network file; and installing the SIM cards in the hardware carrier into the mobile cellular to satellite telecommunication system.

According to preferred aspects of the invention, the recorded information is transferred to a customer support function, such as a customer support center supporting the installation function. Preferably, at the time of installation, the installer reports the part number and serial number assigned to the hardware carrier to the customer support group. Preferably, the customer support function locates the record using the part number and serial number information and activates the SIM cards for use in the mobile cellular to satellite telecommunication system.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF PREFERRED EMBODIMENT

In the Figures, like numerals indicate like elements.

The present invention is a method and device for a control system of a mobile cellular unit that includes an enhanced UART circuit connected to a main system CPU to handle all of the serial data protocols and error checking required to communicate with multiple user terminals, such that the main CPU communicates with multiple user terminals without use of a micro-controller, but still receives the data as parallel words so that CPU processing overhead is kept low.

According to the present inventions access to 30 or more SIM cards is provided without including multiple SIM card readers or a micro-controller, while relieving the main CPU of the task of processing the actual serial data output by the SIM cards. Accordingly, a UART circuit coupled to the main system CPU handles all of the serial data protocols and error checking required to communicate with multiple SIM cards.

Thus, the main CPU is coupled to the SIM cards, but the serial protocol and error checking are off-loaded to the UART. The UART circuit of the invention is not a conventional UART as utilized by the prior art devices. A conventional UART lacks the ability to provide real time error checking and the ability to cause automatic retransmission of data when an error is detected. Thus, a is not able to support the functionality demanded to interface between the CPU and multiple SIM cards and cannot be adapted to the task.

Figure 2:
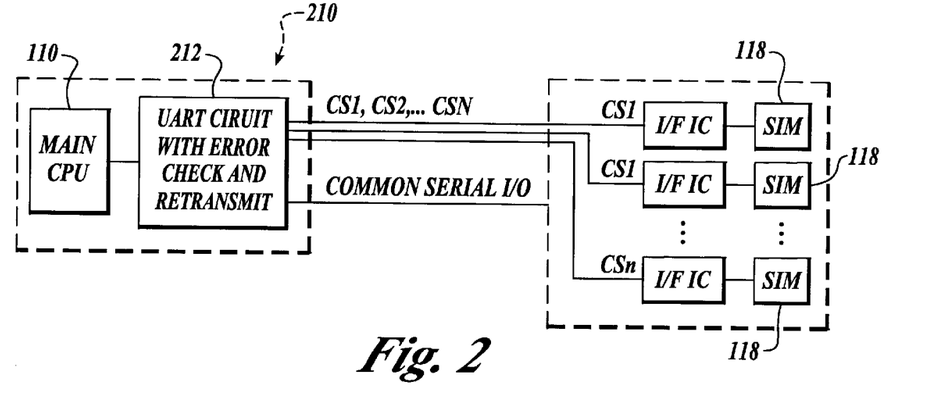
FIG. 2 is a block diagram of the mobile cellular unit of the invention, wherein the control system of mobile cellular unit includes an enhanced UART circuit connected to a main system CPU to handle all of the serial data protocols and error checking required to communicate with multiple user terminals, such that the main CPU communicates with multiple user terminals without going through a micro-controller, but still receives the data as parallel words so that CPU processing overhead is kept low.

FIG. 2 is a block diagram of the mobile cellular unit 200 of the invention. In FIG. 2, the control system 210 of mobile cellular unit 200 includes an enhanced UART circuit 212 connected to main system CPU 110. Preferably, UART circuit 212 is included in control system 210. UART circuit 212 handles all of the serial data protocols and error checking required to communicate with each SIM card 118. UART circuit 212 communicates between the serial port of SIM card 118 and the parallel port of main system CPU 110. UART circuit 212 receives the 8-bit serial output from SIM card 118 and performs the high-overhead processing to convert the signal to an 8-bit parallel word which is output over a standard RS232 bus to the parallel port of main system CPU 110. Thus, in contrast to the mobile cellular unit of the prior art, according to the present invention, main CPU 110 couples to multiple SIM cards 118 without using a micro-controller, and receives the data only as parallel words so that CPU processing overhead remains low.

Furthermore, UART circuit 212 incorporates an address register that is decoded to obtain chip selects for accessing up to 32 or more of SIM cards 118. According to the invention, the number of address lines, or bits, provided by UART circuit 212 is alterable such that any desired number of SIM cards 118 are accessed. UART circuit 212 includes a serial port to receive common serial I/O having multiple serial lines $CS^1$, $CS^2$ through $CS^N$ which couple individual SIM card interface circuits 116 to UART circuit 212. Each interface circuit 116 allows UART circuit 212 to access one SIM card 118. SIM interface circuits 116 use the chip selects to access individual ones of multiple SIM cards 118. Each SIM interface circuit 116, acting in combination with UART circuit 212, uses the chip selects to access individual ones of SIM cards 118. Each of SIM interface circuits 116 is preferably an integrated circuit, such as Motorola® MC33560 or anther integrated circuit having similar characteristics.

Figure 3:
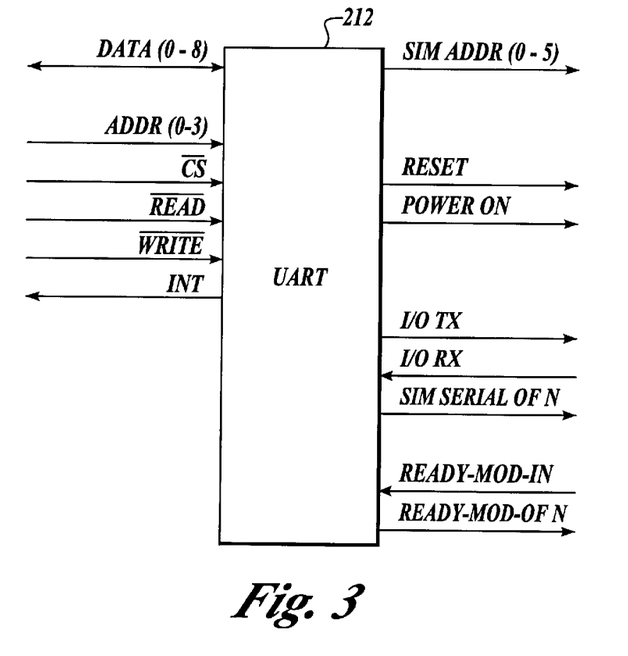
FIG. 3 illustrates the various inputs and outputs of a preferred enhanced UART circuit of the invention for performing parallel signal conversion on a serial data stream and converting the serial data to 8-bit parallel words for use by the main system CPU, thereby keeping the CPU processing overhead low.

FIG. 3 illustrates the various inputs and outputs of a preferred enhanced UART circuit 212 of the invention, including standard parallel and serial I/O ports. According to the invention, UART circuit 212 performs parallel signal conversion on the serial data stream from each SIM card 118, converting the serial data to 8-bit parallel words for use by main system CPU 110, and thereby maintaining the low processing overhead traditionally practiced in main system CPU 110. UART circuit 212 converts parallel input received from main system CPU 110 to serial output for transmission to SIM card reader 214.

In FIG. 3, UART circuit 212 incorporates many standard control lines and interfaces found in UARTs generally, including eight data lines for transferring data characters and for reading and writing to control registers; three address lines for controlling which internal data or control register is accessed; one Chip Select for UART circuit 212; one READ control line; one WRITE control line; and one Interrupt line. Main system CPU 110 coupled to the Interrupt line polls the status to determine the source of the interrupt, which may be, for example, Transmit Done or Data Ready. While including the described standard UART interface lines, UART circuit 212 of the invention further incorporates a register for addressing multiple SIM cards 118. Accordingly, UART circuit 212 incorporates a register with 5 bits that correspond to address lines that are decoded into chip selects for up to 32 or more of SIM cards 118.

Figure 4:
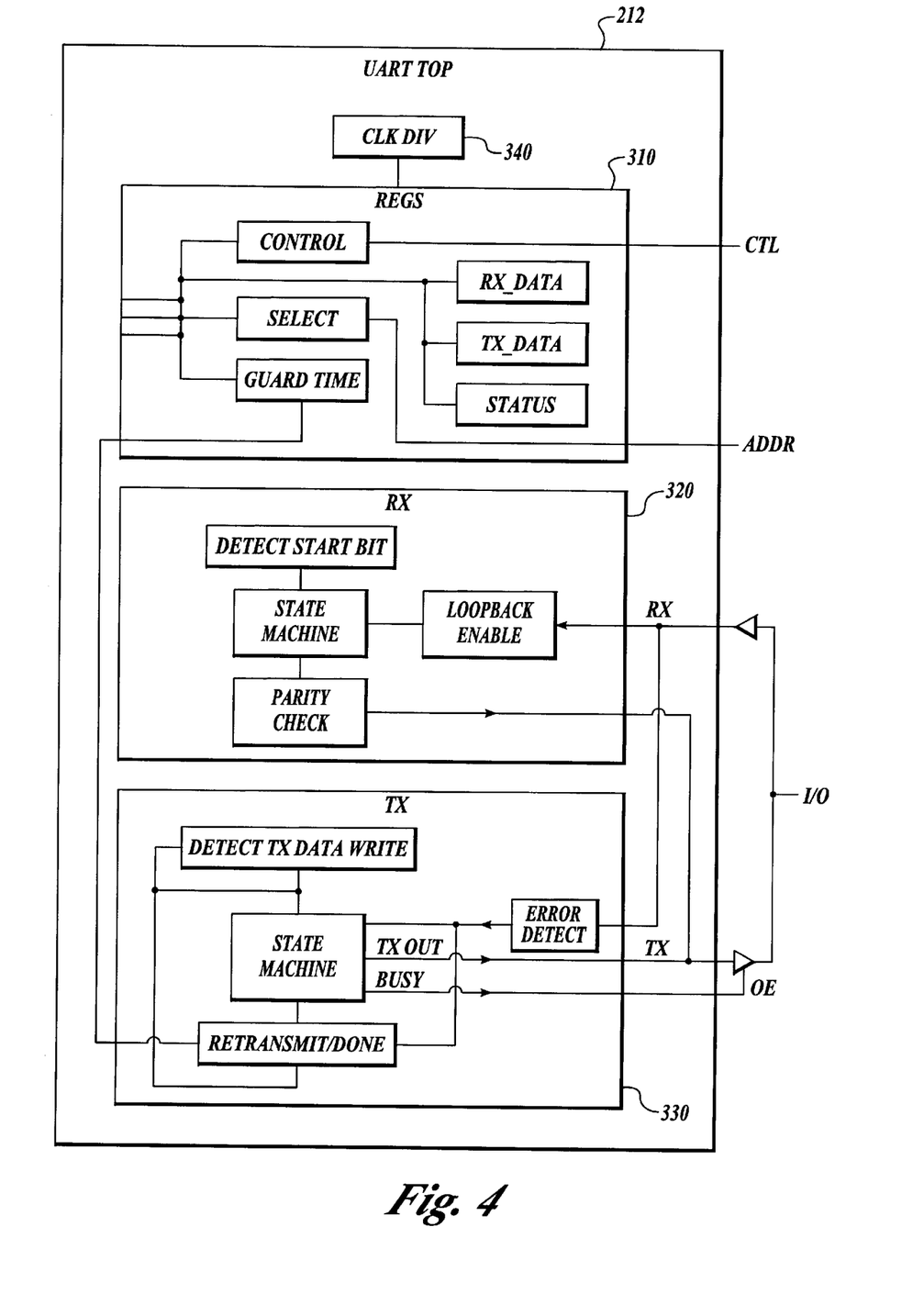
FIG. 4 illustrates the block diagram of one embodiment of the enhanced UART circuit of the invention, which incorporates many standard UART interface lines and a register for addressing multiple SIM cards, and is adapted to use the same language used by the SIM cards and, preferably, to handle the entire serial interface to the SIM cards as prescribed by ISO 7816-3.

FIG. 4 illustrates the block diagram of one embodiment of UART circuit 212 of the invention. As mentioned above, UART circuit 212 incorporates many standard UART interface lines and a register for addressing multiple SIM cards 118. SIM interface UART circuit 212 is preferably generated using VHSIC Hardware Description Language (VHDL) code and programmed into a Complex Programmable Logic Device (CPLD) or a Field Programmable Gate Array (FPGA). UART circuit 212 is preferably coded generically so any manufacturers' product can be used. UART circuit 212 is adapted to use the same language used by SIM cards 118. UART circuit 212 preferably handles the entire serial interface to SIM cards 118 as prescribed by ISO 7816-3. Specifically, UART circuit 212 preferably incorporates the following features. Although defaulting to Direct Convention on power up, UART circuit 212 is preferably configurable for either direct or inverse convention mode; where direct convention is defined by:

Least Significant Bit First, where +5V=logical 1; and 0V=logical 0;

and inverse convention is defined by:

Most Significant Bit First, +5V=logical 0; and 0V=logical 1.

As shown in FIG. 4, UART circuit 212 is configured having three complementary cooperating functions: a control function 310, a receive function 320, and a transmit function 330. Control function 310 is coupled to a system clock 340 and includes the multiple data lines mentioned in connection with FIG. 3 for transferring data characters and to READ and WRITE to control registers, where serial-to-parallel data conversion is practiced on the data received from SIM reader 214, and where parallel-to-serial conversion is practiced on the data received from main system CPU 110. Control function 310 of UART circuit 212 converts parallel bus data from CPU 110 to serial data for SIM cards 118 using a shift register. Control function 310 also converts serial data from SIM cards 118 to parallel bus data using a shift register. Control function 310 also includes the above mentioned address lines for controlling which internal data or control register is accessed and the Chip Select for the UART. Control function 310 of UART circuit 212 also contains in hardware the Extra Guard Time Counter for timing the extra guard time required by SIM card 118. Guard time is set using a control register, preferably in the range of 0 to 255 elementary time unit, or ETU, which is the time for transmitting 1 bit. The guard time required by SIM card 118 is derived from the answer to reset, or ATR, and is preferably configured by main system CPU 110, preferably defaulting to 0 on power up.

In FIG. 4, UART circuit 212 includes receive (RX) ftnction 320, which is coupled to receive serial data from individual ones of the multiple communication channels of the mobile cellular to satellite telecommunication system and to receive parallel data from main system CPU 110. Receive function 320 includes a loop-back mode, including a loop-back enable, whereby main system CPU 110 tests its functionality for performing built-in-test, or BIT testing. Receive function 320 also provides error detection: UART circuit 212 preferably detects, in hardware, parity errors in the received data in either the direct or the inverse mode, described above. Receive fuction 320 preferably asserts an error signal/retransmit request to transmit function 330 in response to detected parity errors as prescribed by ISO 7816-3. This error signal/retransmit request option is optionally enabled or disabled using the control register in control function 310, and preferably defaults to DISABLED on power up. Preferably, UART circuit 212 only sends a DATA READY interrupt when an error free character has been received.

Transmit function 330 is coupled to transmit parallel bus data to main system CPU 110 and to transmit serial data to SIM reader 214. Transmit function 330 includes a detection function coupled to receive function 320 for detecting an asserted error signal/retransmit request. Preferably, transmit function 330 of UART circuit 212 detects the error signal asserted by receive function 320 and automatically retransmits the last character. Transmit function 330 generates a TX DONE interrupt once the character has been sent error free, and a signal has been received from the Extra Guard Time Counter in control function 310 that the extra guard time has expired.

The invention contemplates various alternative embodiments of the configuration described above and illustrated in FIGS. 2 through 4. Each eliminates micro-controller 114 from the mobile cellular unit without shifting the parallel signal conversion to main system CPU 110, thereby increasing overall reliability without increasing the processing overhead of main system CPU 110. According to a one alternative embodiment, main system CPU 110 includes a UART for transmitting command words from main system CPU 110 to each SIM card 118 via a standard RS232 interface. Each SIM card 118 is coupled to receive the command words across the RS232 interface, and the eight-bit microprocessor onboard each SIM card 118 is programmed for reading in command words from main system CPU 110. Furthermore, the onboard microprocessor for each SIM card 118 includes known software implementing SIM serial I/O protocol for performing parallel signal conversion and transmitting data only as parallel words so that processing overhead is kept low. Preferably, the onboard microprocessor is a fully tested commercially available integrated circuit.

According to another alternative embodiment that eliminates micro-controller 114 from the mobile cellular unit without shifting the parallel signal conversion to main system CPU 110, main system CPU 110 includes a UART for sending command words to SIM card 118. SIM card 118 includes another UART and a hardware Programmable Logic Device (PLD) for reading in command words delivered over a standard RS232 interface and implementing SIM serial I/O protocol.

Figure 5:
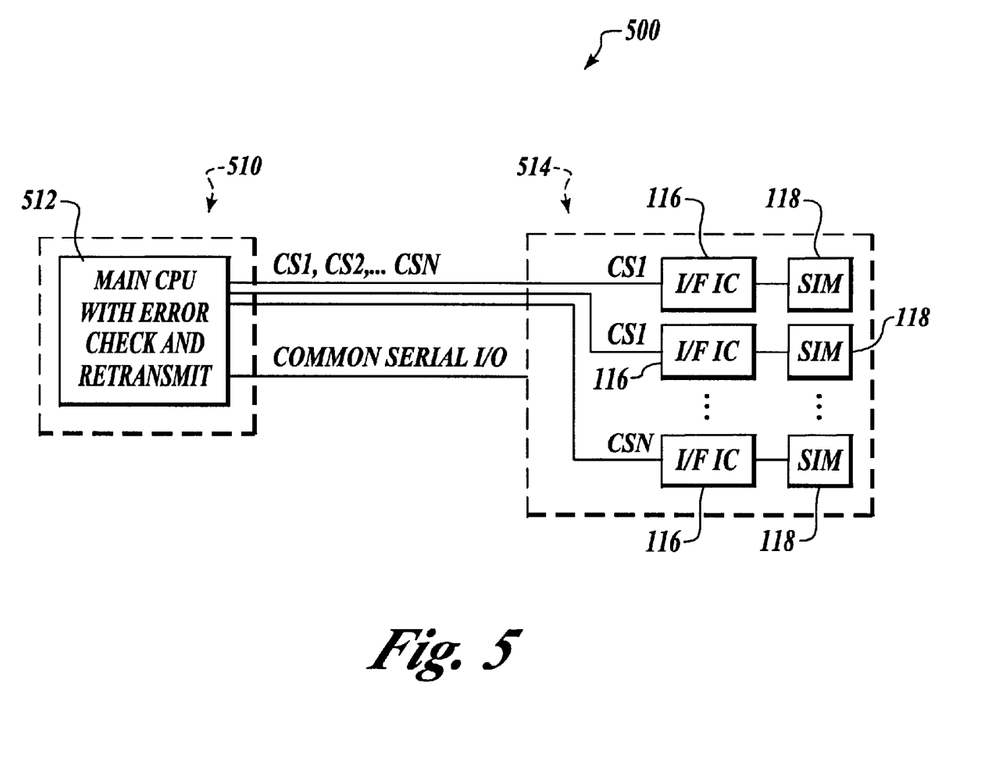
FIG. 5 illustrates one alternative embodiment of the present invention, wherein the main system CPU couples to multiple SIM cards without using a micro-controller, but still receives the data as parallel words so that CPU processing overhead is kept low.

FIG. 5 illustrates one alternative embodiment of the present invention, wherein main CPU 110 couples to multiple SIM cards 118 without going through a micro-controller, but still receives the data only as parallel words so that processing overhead is kept low. According to the alternative embodiment shown in FIG. 5, a mobile cellular unit 500 includes a control system 510, having a main system CPU 512 coupled to a SIM card reader 514. SIM card reader 514 includes only multiple individual SIM cards 118 and associated individual SIM card interface circuits 116, as described above. Main system CPU 512 includes a serial port to receive common serial I/O $CS^1$, $CS^2$ through $CS^N$, which couple each SIM interface circuit 116 to main system CPU 512. Each SIM card interface circuit 116 allows main system CPU 512 to access one Subscriber Interface Module, or SIM card, 118. Main system CPU 512 is adapted to provide the above described essential functions of micro-controller 114 of the prior art. Main system CPU 512 incorporates an address register that it decodes to obtain chip selects for SIM cards 118, which are used by SIM card interface circuits 116 to access individual SIM cards 118. Main system CPU 512 is adapted to provide parallel signal conversion, such that main system CPU 512 receives the 8-bit serial output from each SIM card 118 and performs the high-overhead processing to convert the signal to an 8-bit parallel word. Increased processing capacity is optionally added to handle the parallel signal conversion. Although the embodiment of FIG. 5 results in a high CPU processing load, overall reliability of mobile cellular unit 500 is improved over the prior art by eliminating the additional microprocessors used by prior art devices to off-load control of individual SIM cards 118 from main system CPU 110 so as to reduce demands on the processing time required to handle the serial data.

The invention contemplates various alternative embodiments of the configuration described above and illustrated in FIG. 5. Each again eliminates micro-controller 114 from the mobile cellular unit by shifting the processing to main system CPU 110 and a UART. A CPU board including both main system CPU 10 and the UART also includes transmit and receive control hardware and software as described above. The UART performs parallel-to-serial conversion and transmits the serial data to each SIM card 118. The UART performs serial-to-parallel conversion on the data stream from each SIM card 118. Main system CPU 110 also includes conventional software to read the parallel SIM data and perform error detection, and also includes conventional software to poll the UART for status.

According to another alternative embodiment that eliminates micro-controller 114 from the mobile cellular unit by shifting the processing to main system CPU 110, main system CPU 110 includes registers for the SIM card 118 interface and control signals. Main system CPU 110 transmits addresses to SIM card 118 for the SIM chip selects. Main system CPU 110 includes conventional software to toggle and read the SIM serial interface and perform error detection.

As mentioned above, accurate mapping of SIM cards to their associated terminals in the mobile cellular unit is critical to functionally enabling a system for operation on the mobile cellular to SatCom network. The present invention provides an accurate and verifiable method of installing and mapping the SIM cards to associated terminals in the control system.

Figure 6:
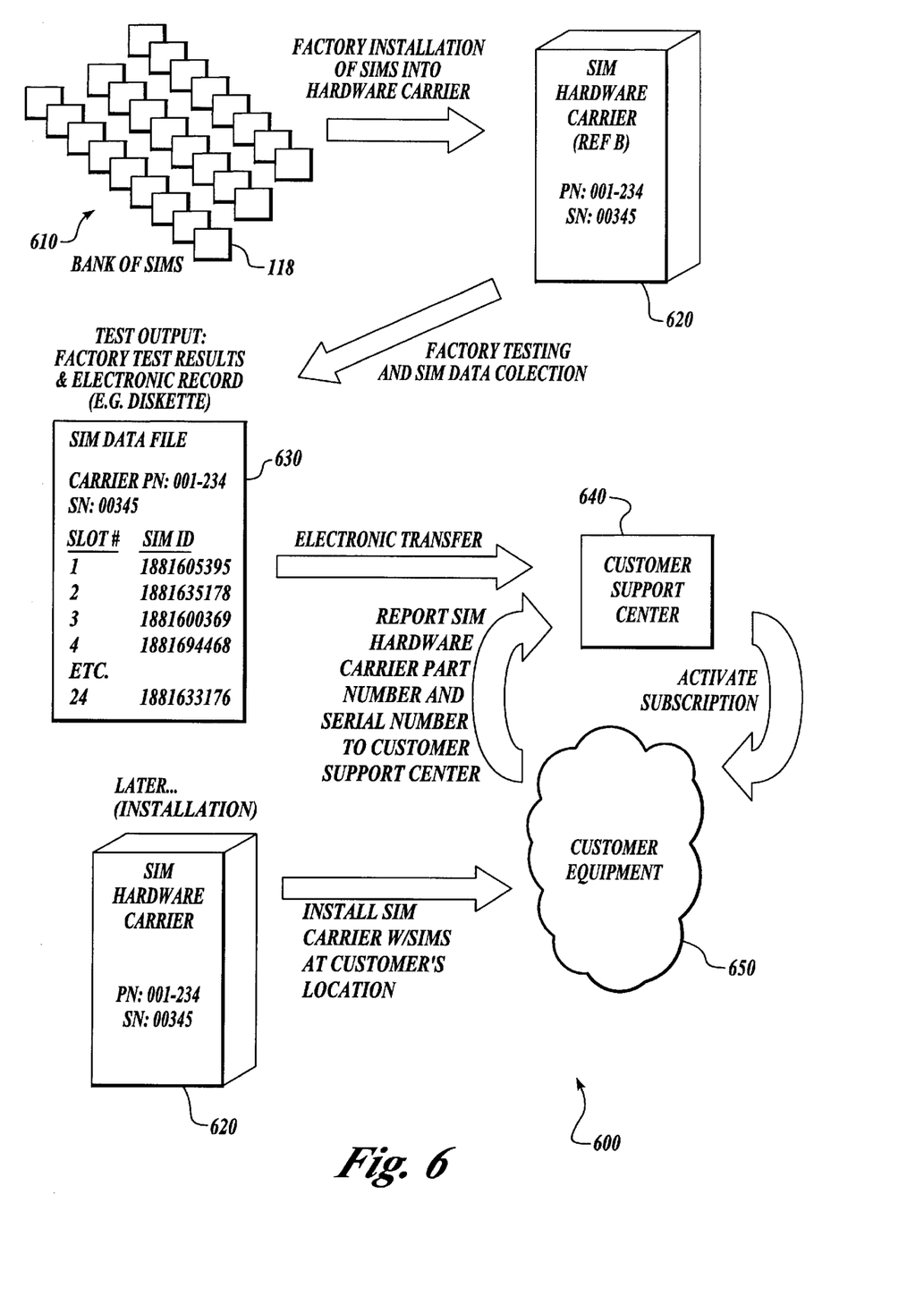
FIG. 6 outlines the method of the invention for installing SIM cards which accurately maps multiple SIM cards to their associated terminals in the mobile cellular unit, thus providing the critical functionally that enables a system to operate on the mobile cellular to SatCom network in applications which incorporate a hardware carrier for handling multiple SIM cards, such as aircraft and other vehicle applications.

FIG. 6 outlines the method of the invention for installation for SIM cards 118, also known as the SIM card provisioning process, which is preferred over the traditional field installation. The method of the invention provides accurate mapping of SIM cards 118 to their associated terminals in the mobile cellular unit. The accurate mapping method of the invention provides the critical functionality enabling a system to operate on the mobile cellular to SatCom network in aircraft and other vehicle applications that incorporate a hardware carrier for handling multiple SIM cards 118. In FIG. 6, the installation method 600 of the invention improves upon the prior art installation method. In the prior art method, SIM cards 118 are installed in the field at which time the installer is required to accurately record each SIM card identification number and note the installation slot to which the SIM card applies. In contrast, the installation method of the invention provides OEM factory installation of anywhere from individual SIM cards 118 to banks 610 of SIM cards 118 into SIM card hardware carriers 620, preferably in a suitably clean environment. Factory installation is followed by completely factory testing each of the SIM card-to-hardware carrier 620, electrical interfaces and SIM card data collection. During data collection, SIM card 118 identification and position in carrier 620 are electronically recorded and cross-referenced against the part number and serial number assigned to each SIM card hardware carrier 620. Thus, the provisioning of multiple SIM cards is provided with little risk of error. Preferably, the electronic record, or data file, 630 of the factory test results are output to a diskette or another desired electronic recording device for ease of transportation, reference, and storage.

The electronic record, or data file, 630 of the factory test results, including the part number and serial number of a subject SIM card hardware carrier 620 is transferred, preferably electronically, to a customer support center 640. SIM card hardware carrier 620 is field-installed as a unit into the using mobile cellular to SatCom system equipment 650, such as the SIMI card reader of an applicable mobile cellular unit, as described above. At installation, the field installer merely reports the part number and serial number of the subject SIM card hardware carrier 620 to customer support center 640. Customer support center 640 utilizes the part number and serial number information to locate electronic data file 630 previously provided from the factory and activates installed SIM cards 118 for use in the mobile cellular to SatCom communication network.

While the preferred embodiment of the invention has been illustrated and described, it will be appreciated that various changes can be made therein without departing from the spirit and scope of the invention.

What is claimed is:

1. A circuit for performing serial data protocols and error checking, the circuit comprising:
    a plurality of external communication ports, including an input/output port wherein said input/output port is coupled to receive serial data output from a subscriber interface module card reader and coupled to transmit parallel data to a central processing unit;
    a receiver and a transmitter coupled to said input/output port;
    multiple chip selects for addressing different input sources;
    multiple data lines for transferring received data characters and for reading and writing to different ones of a plurality of control registers;
    an address register decodable to obtain different ones of said chip selects, said address register corresponding to a plurality of address lines determining which of said control registers is accessed;
    a serial-to-parallel data conversion function coupled to receive serial data from different input sources, translate said serial data into parallel data, and transmit said parallel data;
    an error checking function coupled to perform error checking on said received serial data wherein said error checking function asserts an error signal retransmit request;
    an error signal/retransmit request detector coupled to receive an asserted one of said error signal/retransmit requests; wherein said transmitter retransmits one of said received data characters in response to a detected one of said asserted error signal/retransmit requests;
    an extra guard time counter, and wherein an interrupt signal generator coupled to said transmitter and to said extra guard time counter, said interrupt signal generator generating a signal indicative of an end of said retransmission of said data character in response to a detected signal received from said extra guard time counter indicative of an expiration of said extra guard time; and
    a pollable interrupt line, whereby a source of an interrupt signal is determined.

2. The circuit recited in claim 1, further comprising said subscriber interface module card reader and said central processing unit.

3. The circuit recited in claim 2, wherein said subscriber interface module card reader further comprises:
    a plurality of subscriber interface module cards; and
    a plurality of interface circuits, each said interface circuit coupled to one of said subscriber interface module cards and to said circuit performing serial data protocols and error checking, and utilizing said chip selects to access individual ones of said subscriber interface module cards.

4. The circuit recited in claim 3, further comprising a common serial bus coupling each of said interface circuits to said input/output port of said circuit performing serial data protocols and error checking.

5. A mobile cellular to satellite telecommunication system comprising:
    a plurality of SIM cards;
    a plurality of SIM card interface circuits, individual ones of said SIM card interface circuits coupled to individual ones of said SIM cards;
    an interface function coupled to receive serial data output from said plurality of SIM card interface circuits, said interface function translating said serial data into parallel data; and
    a CPU coupled to receive said parallel data.

6. The system recited in claim 5, wherein said interface function is embedded in said CPU.

7. The system recited in claim 6, wherein individual serial data lines couple said SIM card interface circuits to a common serial port of said CPU.

8. The system recited in claim 5, wherein said interface function is embedded in an interface circuit coupled to a parallel port of said CPU.

9. The system recited in claim 8, wherein individual serial data lines couple said SIM card interface circuits to a common serial port of said interface circuit.

10. The system recited in claim 5, wherein said interface function further comprises:
    multiple chip selects for addressing different individual ones of said SIM cards;
    multiple data lines for transferring received serial data characters and for reading and writing to different ones of a plurality of control registers; and
    an address register decodable, by said SIM card interface circuits to obtain different ones of said chip selects, said address register corresponding to a plurality of address lines determining which of said control registers is accessed.

11. A mobile cellular to satellite telecommunication system comprising:
    a plurality of SIM cards;
    a plurality of SIM card interface circuits coupling individual ones of said SIM cards to a UART circuit, said UART circuit comprising:
    a) multiple chip selects for addressing different individual ones of said SIM cards;
    b) multiple data lines for transferring received serial data characters and for reading and writing to different ones of a plurality of control registers; and c) an address register decodable by said SIM card interface circuits to obtain different ones of said chip selects, said address register corresponding to a plurality of address lines determining which of said control registers is accessed; and a CPU coupled to receive said parallel data.

12. The system recited in claim 11, wherein said UART circuit is embedded in an interface circuit coupled to a parallel port of said CPU.

13. The system recited in claim 11, wherein said UART circuit is embedded in hardware coupled to a parallel port of said CPU.

14. A method for controlling a mobile cellular to satellite telecommunication system, the method comprising:

accessing an individual one of multiple communication channels;

receiving serial data characters from said accessed communication channel;

detecting parity errors in said serial data;

asserting an error signal/retransmit request signal in response to a detected one of said parity errors;

re-transmitting one said data character in response to a detected one of said asserted error signal/retransmit request signal;

generating an interrupt signal indicative of an end of said retransmission of said data character;

converting said serial data characters to parallel data words;

transmitting said parallel data words to the main system central processing unit, accessing one of a plurality of SIM cards;

remotely installing one or more of said SIM cards into a hardware carrier, each said SIM card forming a plurality SIM card-to-hardware carrier electrical interfaces;

testing each of said SIM card-to-hardware carrier electrical interfaces; identifying a position in said hardware carrier of each said SIM card; recording said position;

installing said SIM cards into the mobile cellular to satellite telecommunication system.

15. The method recited in claim 14, wherein said installing further comprises installing said hardware carrier into the mobile cellular to satellite telecommunication system.

16. The method recited in claim 15, wherein said identifying a position in said hardware carrier of each said SIM card further comprises cross-referencing said position in said hardware carrier of each said SIM card against a part number and serial number assigned to said hardware carrier.

17. The method recited in claim 16, wherein said recording forms an electronic record.

18. The method recited in claim 16, wherein said recording forms a record; and the method further comprising transferring said record to a customer support function.

19. The method recited in claim 18, wherein said installing said SIM cards into the mobile cellular to satellite telecommunication system further comprises reporting said part number and said serial number assigned to said hardware carrier to said customer support function.

20. The method recited in claim 19, further comprises:

locating said record utilizing said part number and said serial number information; and activating said SIM cards for use in the mobile cellular to satellite telecommunication system.

21. The method recited in claim 14, wherein said remotely installing further comprises installing in an OEM factory.

22. A method for remotely installing a plurality of SIM cards into a hardware carrier of a mobile cellular to satellite telecommunication system, the method comprising:

remotely installing one or more SIM cards into a hardware carrier, each said SIM card forming a plurality SIM card-to-hardware carrier electrical interfaces;

testing each of said SIM card-to-hardware carrier electrical interfaces;

identifying a position in said hardware carrier of each said SIM card and cross-referencing said position against a part number and serial number assigned to said hardware carrier;

electronically recording said position;

installing said hardware carrier into the mobile cellular to satellite telecommunication system.

23. The method recited in claim 22, further comprising transferring said record to a customer support center.

24. The method recited in claim 23, further comprises:

locating said record utilizing said part number and said serial number information; and activating said SIM cards for use in,the mobile cellular to satellite telecommunication system.

25. The method recited in claim 22, wherein said remotely installing further comprises installing in an OEM factory.

* * * * *